Sept. 19, 1961     T. H. BONN     3,001,084
MAGNETIC AMPLIFIER WITHOUT RINGBACK
Filed June 28, 1955
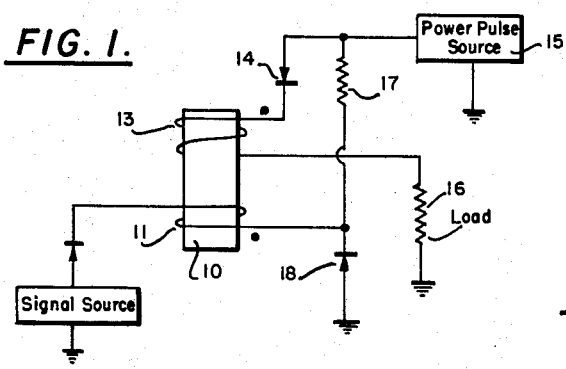
FIG. 1.
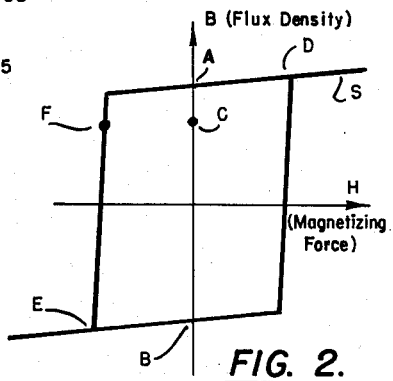
FIG. 2.
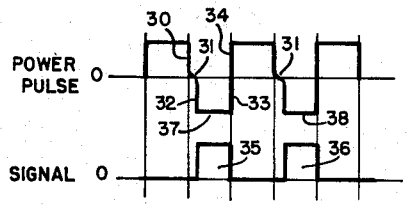
FIG. 3.
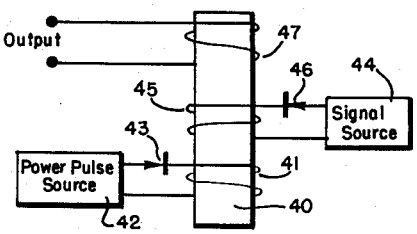
FIG. 4.
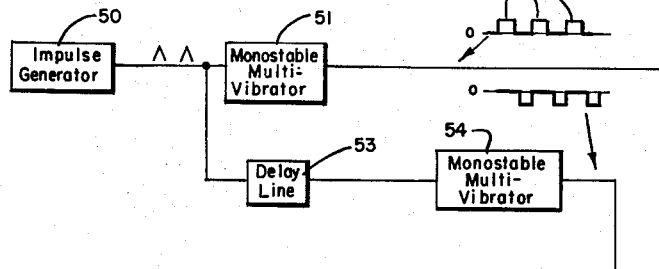
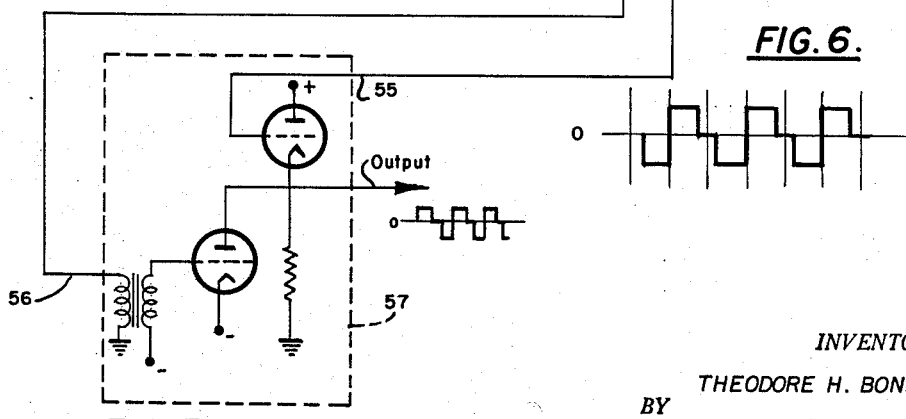
FIG. 6.
FIG. 5.
INVENTOR.
THEODORE H. BONN
BY
*Charles C. English*
AGENT 3,001,084
MAGNETIC AMPLIFIER WITHOUT RINGBACK
Theodore H. Bonn, Philadelphia, Pa., assignor to Sperry Rand Corporation, a corporation of Delaware
Filed June 28, 1955, Ser. No. 518,488
7 Claims. (Cl. 307—88)

This invention relates to magnetic amplifiers and more particularly to such amplifiers which, except for the invention, would inherently have the disadvantages of "ringback." Ringback is an effect often encountered in magnetic amplifiers which reduces the efficiency thereof. It is customary in magnetic amplifiers to employ core material having a substantially square hysteresis loop. The core has one or more windings thereon. The impedance of one of the windings depends on whether the core is operating on a saturated portion of its hysteresis loop or an unsaturated portion thereof. For example, if the core is at positive remanence when a power pulse flows through one of the coils, the core may be driven from positive remanence to positive saturation. Since this is a saturated portion of the hysteresis loop, the coils on the core will have low impedance. If the core had been at negative remanence when that same power pulse occurred, the power pulse would tend to drive the core from negative remanence along an unsaturated portion of the hysteresis loop, in which event the coils on the core will have high impedance.

It follows from the foregoing explanation that in order to have maximum efficiency, the core must, at the beginning of each power pulse, be at positive remanence and, more particularly, at the positive remanence point for the major hysteresis loop of the material as distinguished from the positive remanence point of a minor hysteresis loop of the material. It has been found that when the current through the power winding on the core is suddenly terminated, the distributive capacity of the power winding, taken together with the inductive reactance thereof, may establish a current which will flow in the power winding for a short period after the termination of the power pulse. This current may flow in the power winding in a direction opposite that of the main power pulse current and will therefore tend to drive the core from positive remanence down the hysteresis loop a short distance and leave the core at a point representative of positive remanence on a minor hysteresis loop. In such situation, the next power pulse through the power winding will tend to drive the core from said positive remanence of the minor hysteresis loop to positive saturation. During part of this pulse the core will not be saturated and so there will be less output than there would have been if the core had been at positive remanence of the major hysteresis loop at the beginning of the power pulse. The presence of the aforesaid current which drives the core down the hysteresis loop following termination of the power pulse is known in the art as "ringback."

One very important cause of ringback is the "diode enhancement" characteristic of the rectifier as explained in detail later.

It is a primary object of this invention to provide a magnetic amplifier in which ringback is substantially reduced or eliminated.

Another object of the invention is to reduce the amount of ringback in a series-type of magnetic amplifier.

An additional object of the invention is to reduce the amount of ringback in a parallel-type of magnetic amplifier.

It is another object of the invention to increase the efficiency of a magnetic amplifier.

Other objects of the invention will appear as this description proceeds.

According to the invention, ringback currents are prevented from occurring by providing a special waveform for the power pulses. The potential of each power pulse pauses as it passes down across the zero axis. Further details will appear later.

In the drawings:
FIGURE 1 is a schematic diagram of a complementing series-type magnetic amplifier in which ringback may be reduced according to the teachings of the invention.
FIGURE 2 is an idealized hysteresis loop for the core materials applicable to the several forms of the invention hereinafter described.
FIGURE 3 is a waveform diagram of the source of power pulses of FIGURES 1 and 4.
FIGURE 4 is a schematic diagram of a non-complementing parallel-type magnetic amplifier which may employ the features of the invention.
FIGURE 5 is a block diagram of one suitable generator for producing the waveform of FIGURE 3.
FIGURE 6 is a timing diagram of a modified waveform that may be used in connection with the invention.

FIGURE 1 is a schematic diagram of a complementing series-type of magnetic amplifier. The following is a theoretical explanation of the construction and mode of operation of this magnetic amplifier. The magnetic core 10 may be made of a variety of materials, among which are the various types of ferrites and various magnetic tapes, including Orthonik and 4–79 Molypermalloy. These materials may have different heat treatments to give them different properties. The magnetic material employed in the core should preferably, though not necessarily, have a substantially rectangular hysteresis loop (as shown in FIGURE 2). Cores of this character are now well known in the art. In addition to the wide variety of materials available, the core may be constructed in a number of geometries, including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core, in that the coil on the core is of low effective impedance. On the other hand, when the core is operating on the vertical (or unsaturated) portions of the hysteresis loop, the effective impedance of the coil on the core will be high.

In the theoretical circuits hereinabove mentioned, the source 15 of power pulses generates a train of equally spaced square wave alternating pulses. If it be assumed that at the beginning of any given positive pulse the core has residual magnetism and flux density represented by point A on the hysteresis loop of FIGURE 2, the positive pulse will drive the core from point A to saturation region S. At the conclusion of the pulse, the magnetization will return to point A. Successive positive pulses from power source 15 will flow through rectifier 14, power winding 13 and load 16, repeatedly driving the core from positive remanence point A to saturation region S. During the interval in which the core is being driven from A to S the core is operating on a relatively saturated portion of the hysteresis loop, whereby the effective impedance of coil 13 is low. Hence, power pulses will flow from source 15 to load 16 without substantial impedance. If, however, during the interval between two power pulses, a pulse is generated by the signal source, it will pass through the input coil 11, resistor 17, source 15, to ground. This follows from the fact that during the spaces between positive excursions of source 15, the source goes negative, thus tending to draw current from ground, through rectifier 18, resistor 17, to source 15, whereby the cathode of rectifier 18 is slightly more negative than ground and thus a positive pulse fed to the input will tend to flow toward the cathode of rectifier 18. The input signal flowing through coil 11 will magnetize the core negatively, driving it from point A to point E on the hysteresis loop of FIGURE 2. At the conclusion of this negative pulse the core will be at negative remanence point B. The next positive power pulse from source 15 is just sufficient to drive the core from point B to point D. Since this is a relatively unsaturated portion of the hysteresis loop, the coil 13 will have high impedance during this pulse and the current flow therethrough will be very low. At the conclusion of this pulse, the magnetization will return to zero value A. If no signal appears on the input immediately following the last-named positive power pulse, the next positive power pulse will drive the core to saturation at S and will give a large output at the load 16.

Consequently, it is clear that the magnetic amplifier of FIGURE 1 will feed large pulses to the load in response to each positive pulse from source 15, except that immediately after the receipt of an input pulse at the input 12 the next positive power pulse from source 15 will be blocked. As stated above, the foregoing is a theoretical explanation of the operation of a complementing series-type magnetic amplifier. In actual practice, coil 13 not only has inductive reactance but also distributive capacity and therefore it is possible (when the source 15 has a square wave) for a current to flow in the coil after a positive excursion of the power pulse has ceased, for reasons now to be explained.

Since the potential of each positive excursion drops steeply as it approaches the zero potential axis, and continues immediately beyond that axis, the rectifier 14 is conducting as long as the source 15 is positive, while the rectifier is sharply cut off as the potential of source 15 goes negative (assuming said square wave). The steep drop in potential of the source 15, together with the sharp cut-off due to the negative potential of 15 appearing at the anode of rectifier 14, will leave the coil 13 in a condition where no power pulse current from source 15 is flowing therethrough, but nevertheless there is a large flux set up in the core. This flux would tend to collapse immediately except for the distributed capacity in the coil. The distributed capacity of the coil 13, together with its inductance, will control the collapse of the field and will cause a flow of current from the coil 13 through the distributed capacity of that coil. This current, known as the ringback current, is in a direction opposite to the direction of the power pulses and therefore tends to drive the core 10 down the hysteresis loop. For example, at the termination of a positive power pulse the core will be at positive remanence A. The ringback current may tend to drive the core from point A to point F on the hysteresis loop, and at the termination of the ringback current, the core would move to point C (of FIGURE 2), which is positive remanence on a minor hysteresis loop. Therefore, the next positive power pulse from source 15 will tend to drive the core from point C to saturation region S and during part of that pulse, the core will be operating on an unsaturated portion of the hysteresis loop and therefore coil 13 will have high impedance to that portion of the pulse. This will reduce the output of the magnetic amplifier and therefore lower the efficiency thereof.

Another cause of ringback in magnetic amplifiers is rectifier enhancement. This phenomenon is a temporary increase in the reverse current of the rectifier after the rectifier has carried forward current. Enhancement is believed due to storage of minority carriers in the semiconductor. Enhancement is quite pronounced in many types of germanium and silicon point contact and gold bonded rectifiers. The enhancement increases as the current carried by the rectifier increases. If the current through the rectifier is reduced to zero gradually and/or if there is a pause after the current is reduced to zero, then the enhancement is greatly decreased. Therefore, an object of this invention is to reduce ringback by decreasing the current through the output rectifier slowly and/or to allow a pause after the current is reduced to zero in order to provide reduced ringback caused by enhancement current. Notice that the enhancement current is reverse current in the diode and tends to operate the core to point F and then point C of FIGURE 2.

In other words, in the actual circuit (still assuming a square wave), as distinguished from the theoretical circuit, the core will operate for part of each positive pulse below the optimum saturation level of A to S, and therefore the coil 13 will have higher impedance than it would have in the theoretical circuit. This means that the output at the load 16 is less than would be true for the theoretical circuit. According to the invention, ringback may be reduced, or in some cases completely eliminated, if the source of power pulses has a waveform as shown in FIGURE 3. This waveform has a substantially square positive excursion. The trailing edge 30 of this waveform is therefore very steep. When the trailing edge 30 of the positive excursion reaches the zero axis, it pauses, as shown at 31, before moving sharply negative with the steep wave front 32. However, when the potential of the negative excursion drops, the steep drop 33 occurs at substantially the same instant that the wave moves positively along the steep wave front 34. In other words, no pause occurs as the cycle goes from negative to positive, but there is a pause 31 as the cycle goes from positive to negative. The negative halves of the waves are therefore of shorter time than the positive halves. The input signal source is inherently so timed that it produces positive signals only during the intervals when the power pulse source is going negative. For example, the signal source produces signals 35 and 36 during the negative excursions 37 and 38 respectively of source 15.

Since the rectifier 14 is not cut off sharply, in accordance with the invention, the effect of the positive excursion of the power pulse will die out more gradually than in the case of prior art circuits, and therefore the collapse of the field will not produce as much negative magnetizing force in the core as would be the case if a true square wave alternating current was produced by source 15.

FIGURE 4 is a modified form of the invention which has a core 40 which may be composed of any of the materials and may have any of the shapes heretofore mentioned. It has a power winding 41 connected to a pulse source 42 through a rectifier 43. The signal source 44 may energize signal coil 45 through a rectifier 46. An output winding 47 feeds the load. In the absence of signals at the signal source 44, the alternating current source 42 (which for the moment is assumed to be a square wave source), will tend to drive the core 40 from positive remanence to positive saturation in response to each positive pulse of that source. Since this operation will take place along the saturated portion of the hysteresis loop, the change of flux in the core will be small and hence practically no potential will be induced in output coil 47. If, however, during a space between two positive excursions of the source 42, the signal source 44 produces a signal in winding 45, which tends to drive the core from point A to point E on the hysteresis loop of FIGURE 2, the core will be reset and the next positive pulse from source 42 will drive the core from negative remanence B to point D of FIGURE 2. This is an unsaturated portion of the hysteresis loop and is attended by a high change of flux in the core 40. Hence, there will be a large potential induced in coil 47, and therefore a large output therefrom. This type of amplifier is known as a non-complementing parallel one.

If the source of power pulses 42 was a true square wave source, as the potential moved sharply from a positive excursion to the negative excursion, rectifier 43 would be abruptly cut off and when so cut off, would leave the core with a large field which would collapse. The collapse of the field would be controlled by the inductive reactance, together with the distributed capacity of the coils and a ringback effect would occur. This ringback effect would drive the core negatively from point A to point F, the same as in connection with FIGURE 1, and would leave it at positive remanence on a minor hysteresis loop (for example point C of FIGURE 2), at the end of each positive excursion of source 42 (assuming no signals from the signal source 44). Consequently, the positive pulses of source 42 would drive the core from point C to point S during each positive excursion of the pulse, and since this is not entirely a saturated portion of the core, there would be a substantial change of flux in coil 47 and a substantial output.

Ringback in connection with FIGURE 4 may be reduced and/or eliminated, the same as in connection with FIGURE 1, by employing a waveform for the power pulses as shown in FIGURE 3. In other words, if the source 42 of FIGURE 4 has the waveform shown in FIGURE 3, ringback will be reduced and/or eliminated. In FIGURE 4, the signal source produces its signals only during the negative excursions of the source 42, all as illustrated in FIGURE 3.

FIGURE 5 is a block diagram of means for producing the waveform of FIGURE 3. It employs a timing generator 50 which produces a train of equally spaced timing pulses. These pulses are fed to the monostable multivibrator 51 which produces the square pulses 52. The timing pulses are also fed through delay line 53 to monostable multivibrator 54. The latter multivibrator is identical with multivibrator 51 except that it produces negative square pulses. The delay line 53 produces a delay equal in time to the duration of pulse 52 plus the pause hereinabove described. The output of multivibrators 51 and 54 are fed to two inputs 55 and 56 of mixer 57. The mixer is a conventional one for combining negative and positive signals, and it produces an output which is the combination of the outputs of multivibrators 51 and 54, in the well known way. In FIGURE 3, the negative half cycle is of shorter duration than the positive half cycle, and when this is desired, it can be readily achieved by causing the output of multivibrator 54 to be somewhat narrower than the output of multivibrator 51.

As shown in FIGURE 6, the invention can also be carried out with a waveform in which the positive and negative excursions are of equal time durations.

I claim to have invented:

1. A magnetic amplifier having a saturable core with a substantially rectangular hysteresis loop, a coil on the core, a rectifier in series with said coil to allow flow of current through said coil in only one direction, a source of alternating voltage connected in series with said rectifier and coil and which voltage has a waveform that on a first portion of each cycle causes flow of current through said rectifier and on the second portion of each cycle cuts off the rectifier, said source having a voltage waveform that pauses for a fraction of a cycle as it passes the zero axis on its way from the first to the second portions of each cycle, and means including a signal source for periodically resetting the core during second portions of the cycle.

2. A magnetic amplifier having a saturable core, a coil on the core, a rectifier in series with said coil to allow flow of current through said coil in only one direction, a source of alternating voltage connected in series with said rectifier and coil and voltage has a waveform that which on a first portion of each cycle causes flow of current through said rectifier and on the second portion of each cycle cuts off the rectifier, said source having a voltage waveform that pauses for a fraction of a cycle as it passes the zero axis on its way from the first to the second portions of each cycle, a second coil on the core, and a signal source for passing a current through the second coil only during selected second portions of the cycles for resetting the core.

3. A complementing series type magnetic amplifier comprising a saturable core having a substantially rectangular hysteresis loop, a power winding on the core, a source of alternating voltage, a load, a rectifier, a series circuit including said source, said load, said rectifier and said winding, said rectifier being poled to allow current to flow through the series circuit during one portion of a cycle of said source and being cut off during another portion of said cycle, a signal winding on the core, a signal source for energizing said signal winding only during portions of said cycles during which the rectifier is cut off and then only when it is desired to inhibit output from the amplifier, said source having a voltage waveform that momentarily does not change during a remaining cycle portion when there is substantially no voltage across said rectifier and, thereby, does not produce a substantial ringback current as the potential changes from said one to the said other cycle portion.

4. A non-complementing parallel type magnetic amplifier comprising a saturable core having a substantially rectangular hysteresis loop, a power winding on the core, a rectifier, a source of alternating voltage, a series circuit including said source, said winding and said rectifier, said rectifier being poled to allow current to flow in said circuit during portions of cycles of one voltage polarity and being cut off in response to the other polarity during other cycle portions, a signal winding on the core, a signal source for applying a resetting signal current to the signal winding during portions of cycles of said other polarity when it is desired to produce output signals, and an output winding on the core, said source producing an alternating voltage whose waveform has a steep drop at the end of the portions of cycles of said one polarity, which then pauses at the zero axis, and which then increases steeply in the other direction, whereby to overcome ringback.

5. A magnetic amplifier having a saturable core, a coil on the core, a rectifier in series with said coil to allow flow of current through said coil in only one direction and a source of alternating voltage connected in series with said rectifier and coil and which on a first portion of each cycle causes flow of current through said rectifier and which on the second portion of each cycle cuts off the rectifier, said source having a voltage waveform in which one portion of each cycle is of rectangular waveform and the other portion of each cycle also being of substantially rectangular waveform with a space between these two portions of cycles, the leading edge of said one cycle portion being a straight-line continuation of the trailing edge of the preceding portion cycle, a load in series with said rectifier, said source, and said coil, and input signal means for applying a resetting magnetizing force to the coil during said other portions of cycles when it is desired to inhibit output.

6. A magnetic amplifier system comprising a saturable magnetic element, a first and second winding linked to said element, a diode element, a source of alternating voltage connected in a series circuit with said first winding and said diode element, the waveform of said alternating voltage periodically including portions within each cycle during which the voltages across said diode element are respectively in opposite directions, and another cycle portion between said other portions during which there is momentarily substantially no change of voltage, said another portion being at a time when there is substantially zero voltage across said diode element, and input means for aperiodically energizing said second winding only during those portions of said periodically alternating waveform in which the voltage is in the back direction across said diode element.

7. A magnetic amplifier system comprising a saturable magnetic element, a first and second winding linked to said element, a diode element, a source of alternating voltage connected in a series circuit with said first winding and said diode element, the waveform of said alternating voltage periodically including portions during which the voltages across said diode element are respectively in opposite directions, and another portion between said other portions during which there is momentarily substantially no change of voltage, said another portion being at a time when there is substantially zero voltage across said diode element, said source including signal mixing means, and means for supplying to said mixing means signals of opposite-going direction with a time delay therebetween and input means for periodically energizing said second winding.

References Cited in the file of this patent

UNITED STATES PATENTS

| | | |
|---|---|---|
| 2,569,468 | Gaughler | Oct. 2, 1951 |
| 2,729,781 | Gilbert | Jan. 3, 1956 |
| 2,749,451 | Talambiras | June 5, 1956 |
| 2,772,370 | Bruce et al. | Nov. 27, 1956 |
| 2,786,147 | Kaufmann | Mar. 19, 1957 |
| 2,854,656 | Bartik | Sept. 30, 1958 |